(12) United States Patent
Hattori et al.

(10) Patent No.: US 9,045,124 B2
(45) Date of Patent: Jun. 2, 2015

(54) VACUUM BRAKE BOOSTER

(71) Applicant: ADVICS CO., LTD., Kariya (JP)

(72) Inventors: Masafumi Hattori, Okazaki (JP); Kenta Ishikawa, Nagoya (JP)

(73) Assignee: ADVICS CO., LTD, Kariya-Shi, Aichi-Ken (JP)

( * ) Notice: Subject to any disclaimer, the term of this patent is extended or adjusted under 35 U.S.C. 154(b) by 401 days.

(21) Appl. No.: 13/660,730

(22) Filed: Oct. 25, 2012

(65) Prior Publication Data

US 2013/0098236 A1    Apr. 25, 2013

(30) Foreign Application Priority Data

Oct. 25, 2011    (JP) .................................. 2011-233679

(51) Int. Cl.
*B60T 13/57*    (2006.01)

(52) U.S. Cl.
CPC ...................................... *B60T 13/57* (2013.01)

(58) Field of Classification Search
CPC .................................. B60T 13/57; B60T 13/52
See application file for complete search history.

(56) References Cited

U.S. PATENT DOCUMENTS

| | | | | |
|---|---|---|---|---|
| 5,083,497 A | * | 1/1992 | Araki et al. | 91/369.3 |
| 5,839,344 A | * | 11/1998 | Tsubouchi | 91/376 R |
| 6,067,891 A | * | 5/2000 | Gautier et al. | 91/376 R |
| 6,192,783 B1 | * | 2/2001 | Tobisawa | 91/369.2 |
| 6,389,951 B1 | * | 5/2002 | Castel et al. | 91/376 R |
| 7,089,846 B2 | * | 8/2006 | Tsubouchi et al. | 91/376 R |

FOREIGN PATENT DOCUMENTS

JP    2007-022435 A    2/2007

* cited by examiner

*Primary Examiner* — Thomas E Lazo
(74) *Attorney, Agent, or Firm* — Buchanan Ingersoll & Rooney PC

(57) ABSTRACT

A vacuum brake booster includes a movable wall forming a vacuum chamber and a variable pressure chamber in a housing and a valve body connected to the movable wall. A valve mechanism having a vacuum valve for establishing or interrupting the communication between both chambers corresponding to the movement of a plunger and having an air valve for establishing or interrupting the communication between the variable pressure chamber and atmosphere are disposed in an axial hole of the valve body. Atmosphere after the air valve passed flows into the variable pressure chamber through an axial passage and a radial passage formed in the valve body. The axial passage is constituted by a cylindrical inner passage formed at the outer circumference of the plunger by an arc-like flow regulating wall and an arc-like inner circumferential wall portion and an outer passage formed at the outer circumference of the inner passage.

3 Claims, 4 Drawing Sheets

VACUUM BRAKE BOOSTER

CROSS-REFERENCE TO RELATED APPLICATION

This application claims priority from Japanese Patent Application No. 2011-233679 filed on Oct. 25, 2011, the entire subject matter of which is incorporated herein by reference.

TECHNOLOGICAL FIELD

This invention generally relates to a vacuum brake booster. More particularly, this invention pertains to a vacuum brake booster applied for an automobile.

BACKGROUND DISCUSSION

A known vacuum brake booster is disclosed in a Japanese Patent Application laid-open publication No. 2007-22435. The disclosed vacuum brake booster is provided with a housing, a movable wall which divides the inside of the housing into a front vacuum chamber and a rear variable pressure chamber, and a valve body which is fixed to the movable wall. The valve body has an axial hole in which a plunger, a valve mechanism, a reaction member and an output member are mounted. The plunger is movable back and forth relative to the valve body. The valve mechanism includes a vacuum valve which establishes or interrupts a communication between the vacuum chamber and the variable pressure chamber in response to the back and forth movement of the plunger relative to the valve body and an air valve which establishes or interrupts a communication between the variable pressure chamber and an atmospheric air in response to the back and forth movement of the plunger. The reaction member can engage with a front end portion of the plunger and a front end portion of the valve body at its rear surface. The output member engages with a front surface of the reaction member at its rear end portion and is axially movable relative to the valve body. A vacuum passage is formed in the valve body and is communicated to the vacuum chamber at its front end. An axial passage is formed in the valve body and is communicated to the atmospheric air at its rear end portion. A radial passage is formed in a portion of the valve body in which the vacuum passage is not formed. The radial passage is communicated to the variable pressure chamber at its radial outer end and is communicated to the axial passage at its radial inner side. When the plunger is axially moved forward from its initial position relative to the valve body, the vacuum closes an arc-like valve seat portion which is formed on a rear end portion of the vacuum passage and the communication between the vacuum chamber and the variable pressure chamber is interrupted. Then, the air valve opens and the variable pressure chamber is communicated to the atmospheric air. Thereby, atmospheric air flows in the variable pressure chamber through the axial passage and the radial passage. When the plunger is axially moved rearward from the forward movement position to the initial position, the air valve closes and the communication between the variable pressure chamber and the atmospheric air is interrupted. Then, the vacuum valve opens and the variable pressure chamber is communicated to the vacuum chamber through the radial passage, the axial passage and the vacuum passage.

In the above-described vacuum brake booster, the flow of the atmospheric air flowing in the portion which the axial passage and the radial passage are connected (intersecting portion) is made smooth and the flow of the atmospheric air is prevented from becoming a turbulent flow. Therefore, the above-described vacuum brake booster can prevent from generating a response lag of the operation and from generating an operation noise due to the turbulent flow of the atmospheric air at the portion connected between the axial passage and the radial passage.

In the above-described vacuum brake booster, however, a structure for making the flow of the atmospheric air in the axial passage smooth is not adopted. As a result, the flow of the atmospheric after passing the air valve under the opening condition becomes a turbulent flow and thereby the response lag of the operation of the vacuum brake booster and the operation noise are generated.

SUMMARY

The improved vacuum brake booster disclosed here is not so susceptible to the above drawback.

The disclosed example of the improved vacuum brake booster includes a housing, a movable wall dividing an inner space of the housing into a vacuum chamber and a variable pressure chamber, a valve body connected to the movable wall and having an axial hole, a plunger disposed in the axial hole of the valve body and being movable in the axial direction relative to the valve body, a valve mechanism disposed in the axial hole of the valve body and having a vacuum valve for establishing or interrupting the communication between the vacuum chamber and the variable pressure chamber corresponding to the movement of the plunger and having an air valve for establishing or interrupting the communication between the variable pressure chamber and atmosphere, a reaction member disposed in the axial hole of the valve body and being able to engage with a front end portion of the plunger and a front end portion of the valve body at its rear surface, an output member disposed in the axial hole of the valve body, being engaged with a front surface of the reaction member at its rear end portion and being movable in the axial direction relative to the valve body, a vacuum passage formed in the valve body and being communicated to the vacuum chamber at its front end, an axial passage formed in the valve body and being communicated to atmosphere at its rear end portion, a radial passage formed in the valve body, being communicated to the variable pressure chamber at its radial outer end and being communicated to the axial passage at its radial inner part, wherein atmosphere flows into the variable pressure chamber through the axial passage and the radial passage when the communication between the vacuum chamber and the variable pressure chamber is interrupted by the vacuum valve and the communication between the variable pressure chamber and atmosphere is established by the air valve, and wherein air flows from the variable pressure chamber to the vacuum chamber through the radial passage, a part of the axial passage being located forward of the air valve and the vacuum passage when the communication between the variable pressure chamber and atmosphere is interrupted by the air valve and the communication between the vacuum chamber and the variable pressure chamber is established by the vacuum valve, a flow regulating wall formed in the valve body, a cylindrical inner passage formed at the outer circumference of the plunger by the flow regulating wall and an inner circumferential wall portion of a passage forming wall which forms the vacuum passage; and an outer passage formed at the outer circumference of the inner passage by the flow regulating wall and circumferential end walls of the passage forming wall, wherein the part of the axial passage being located forward of the air valve is formed by the inner passage and the outer passage.

BRIEF DESCRIPTION OF THE DRAWING FIGURES

The foregoing and additional features and characteristics of the example of the vacuum brake booster disclosed here will become more apparent from the following detailed description considered with reference to the accompanying drawing figures.

DETAILED DESCRIPTION

Figure 1:
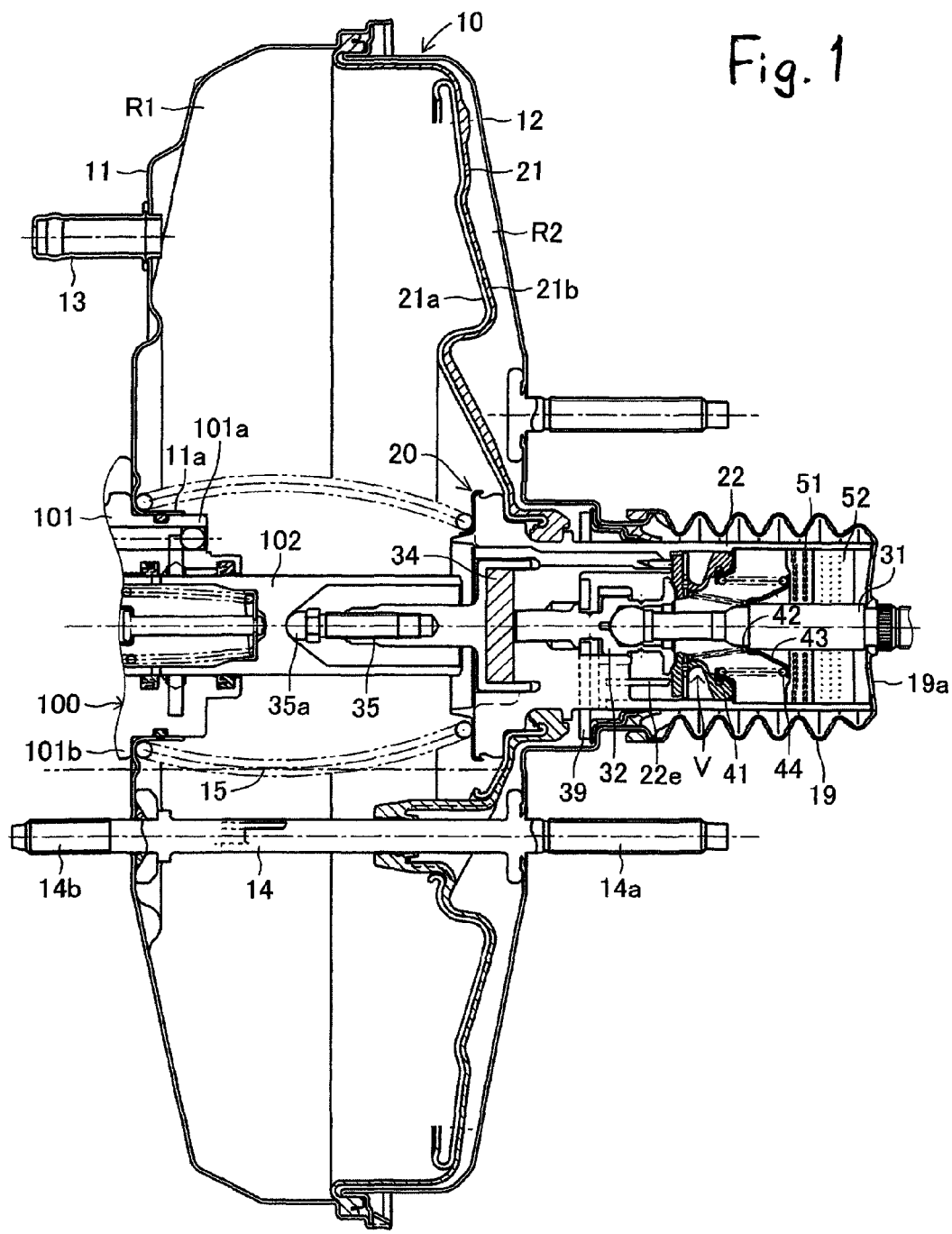
FIG. 1 is a cross-sectional view illustrating a vacuum brake booster according to an embodiment disclosed here by way of example.

A vacuum brake booster constituted in accordance with an embodiment disclosed by way of example will be described with reference to attached drawings. FIG. 1 to FIG. 5 shows an embodiment which the disclosure is applied to a vacuum brake booster for a vehicle. In FIG. 1, a vacuum brake booster has a housing 10 and a power piston 20 including a movable wall 21 and a valve body 22 is mounted in the housing 10. The inside of the housing 10 is divided into a front vacuum chamber R1 and a rear variable pressure chamber R2 by the movable wall 21.

As shown in FIG. 1, the housing 10 is provided with a front shell 11, a rear shell 12 and a vacuum introduction pipe 13 which makes the vacuum chamber R1 always communicate to a vacuum source (for example, an intake manifold of an engine (not shown)). The housing 10 is constituted so as to be fixed to a static member, namely a vehicle body (not shown) at screw portions 14a formed on each rear end portion of plural tie rods 14 (one tie rod shown in FIG. 1) which penetrate the movable wall 21 air-tightly. A brake master cylinder 100 is fixed onto screw portions formed on each front end portions of the tie rods 14.

The brake master cylinder 100 has a cylinder main body 101. A rear end portion 101a of the cylinder main body 101 penetrates a central tube portion 11a formed on the front shell 11 and projects into the vacuum chamber R1 air-tightly. Further, a rear surface of a flange portion 101b formed on the cylinder main body 101 contacts with a front surface of the front shell 11. A piston 102 of the brake master cylinder 100 projects rearward from the cylinder main body 101 and projects into the vacuum chamber R1. Thereby, the piston 102 is pushed frontward by a top end rod portion 35a of an output shaft 35 described below.

The movable wall 21 of the power piston 20 is comprised of a metal annular plate 21a and a rubber annular diaphragm 21b and is disposed in the housing 10 so as to be able to move in the front-back direction (in the axial direction of the power piston 20). The diaphragm 21b is air-tightly nipped between the front shell 11 and a bending portion formed on an outer circumferential edge of the rear shell 12 at an annular outer circumferential bead portion formed on its outer circumferential edge. Further, the diaphragm 21b is air-tightly fixed to a annular groove formed on an outer circumference of a front end portion of the valve body 22 together with an inner circumferential portion of the plate 21a.

The valve body 22 of the power piston 20 is a hollow member made of resin which is connected to the inner circumferential portion of the movable wall 21. The valve body 22 is mounted on the rear shell 12 of the housing 10 at its central part cylindrically formed so as to be able to move air-tightly in the front-back direction. The valve body 22 is urged rearward by a return spring 15 interposed between the front shell 11 and the valve body 22. A part of the valve body 22 projecting into the outside of the housing 10 is covered by a boot 19 which has plural ventilation hole 19a at its rear end.

Further, as shown in FIG. 2 to FIG. 5, a stepped axial hole 22a which penetrates in the front-back direction is formed in the valve body 22. A pair of vacuum passages 22b which communicate with a central step portion of the axial hole 22a at its rear end and which communicate with the vacuum chamber R1 at its front end are formed in the valve body 22. A pair of key mounting holes 22c in which a key member 39 can be inserted from the outer circumference are formed in the valve body 22 and bisect with the front portion of the axial hole at approximately right angles.

An input shaft 31, a plunger 32, a valve mechanism V and filters 51, 52 are coaxially installed in the axial hole 22a. Further, a reaction member 34 and the output shaft (output member) 35 are coaxially installed in the axial hole 22a ahead of the plunger 32.

The input shaft 31 is movable back and forth relative to the valve body 22 and is connected to a connecting portion 32c of the plunger 32 at its spherical top end portion 31a so as to be able to swing. The input shaft 31 is connected to a brake pedal (not shown) through a yoke at its rear end screw portion 31b. Thereby, the input shaft 31 receives forward the depressing force applied to the brake pedal as an input force.

The plunger 32 can engage with a central part of the rear surface of the reaction member 34 at its top end portion 32a and can engage with the key member 39 at an annular flange portion 32b formed on its central portion. The top end portion 32a receives partially a reaction force of an output force from the reaction member 34. Further, an annular air valve seat 32d which can be either in contact with or separated from an annular air valve portion 41b of the valve mechanism V is formed on a rear end of the plunger 32. An air valve which establishes or interrupts the communication between the variable pressure chamber R2 and the atmospheric air.

The reaction member 34 is a rubber disc. A central part of a rear surface of the reaction member 34 can bulge rearward by its deformation. The reaction member 34 is disposed in a rear cylindrical portion 35b of the output shaft 35 and is installed on the front end portion of the valve body 22 under the condition that the whole of a front surface of the reaction member 34 is contacting with an rear surface of the rear end portion of the output shaft 35. The rear surface of the reaction member 34 can contact with a front surface of the top end portion 32a of the plunger 32 and contacts with an annular front end surface of the valve body 22.

The output shaft 35 is mounted in a front end portion of the axial hole 22a of the valve body 22 together with the reaction member 34 so as to be able to move in the front-back direction. As shown in FIG. 1, the top end rod portion 35a is mounted on a top end portion of the output member 35 and contacts with an engaging portion of the piston 102 of the brake master cylinder 100 so as to be able to push the piston 102. The output shaft 35 transfers a reaction force receiving from the piston 102 of the brake master cylinder 100 at the braking operation to the reaction member 34.

The key member 39 has a function to restrict the back and forth movement of the plunger 32 relative to the valve body 22. Further, the key member 39 has a function to define the rearward movement limited position of the power piston 20 relative to the housing 10. The key member 39 is disposed in the key mounting holes 22c of the valve body 22 so as to be able to move with a predetermined amount in the axial direction of the power piston 20 relative to the valve body 22 and the plunger 32, respectively.

The valve mechanism V includes arc-like vacuum valve seats 22d (valve seat portions) which are integrally formed in the rear end portions of each vacuum passages 22b of the valve body 22, the annular air valve seat 32d which is integrally formed on the rear end portion of the plunger 32 and a cylindrical valve member 41 which is coaxially disposed relative to the air valve seat 32d and which is mounted on the valve body 22. The valve member 41 can be either in contact with or separated from the vacuum valve seats 22d. The valve member 41 has a vacuum valve portion 41a which can be either in contact with or separated from the vacuum valve seats 22d and which constitutes a vacuum valve for being able to establish or interrupt a communication between the vacuum chamber R1 and the variable pressure chamber R2 in cooperation with the vacuum valve seats 22d. Further, the valve member 41 has an annular air valve portion 41b which can be either in contact with or separated from the air valve seat 32d and which constitutes an air valve for being able to establish or interrupt a communication between the variable pressure chamber R2 and the atmospheric air in cooperation with the air valve seat 32d.

The vacuum valve portion 41a and the air valve portion 41b are integrally formed on a movable portion (a portion being movable in the axial direction) of the valve member 41 and are urged toward the vacuum valve seats 22d and the air valve seat 32d by a compression spring 42. A fixed portion (a portion being not movable in the axial direction) of the valve member 41 is urged forward by a compression spring 44 which is engaged with a stepped portion of the input shaft 31 through a retainer 43. Thereby, the valve member 41 is kept in a fixed position in the axial hole 22a of the valve body 22.

The variable pressure chamber R2 can communicate with the vacuum chamber R1 or the atmospheric air by the structure of the valve mechanism V in response to the back and forth movement of the input shaft 31 and the plunger 32 relative to the valve body 22. Namely, according to the forward movement of the input shaft 31 and the plunger 32 shown in FIG. 1 and FIG. 2 from the initial position relative to the valve body 22, when the vacuum valve portion 41a contacts with the vacuum valve seats 22d and the air valve seat 32d separates from the air valve portion 41b, the communication between the vacuum chamber R1 and the variable pressure chamber R2 is interrupted and the variable pressure chamber R2 communicates with the atmospheric air. In this situation, the atmospheric air flows into the variable pressure chamber R2 through the ventilation holes 19a of the boot 19, the filters 51, 52, the inside of the valve member 41, a gap between the air valve seat 32d and the air valve member 41b, an axial passage X and a radial passage Y formed in the valve body 22 and so on.

Figure 2:
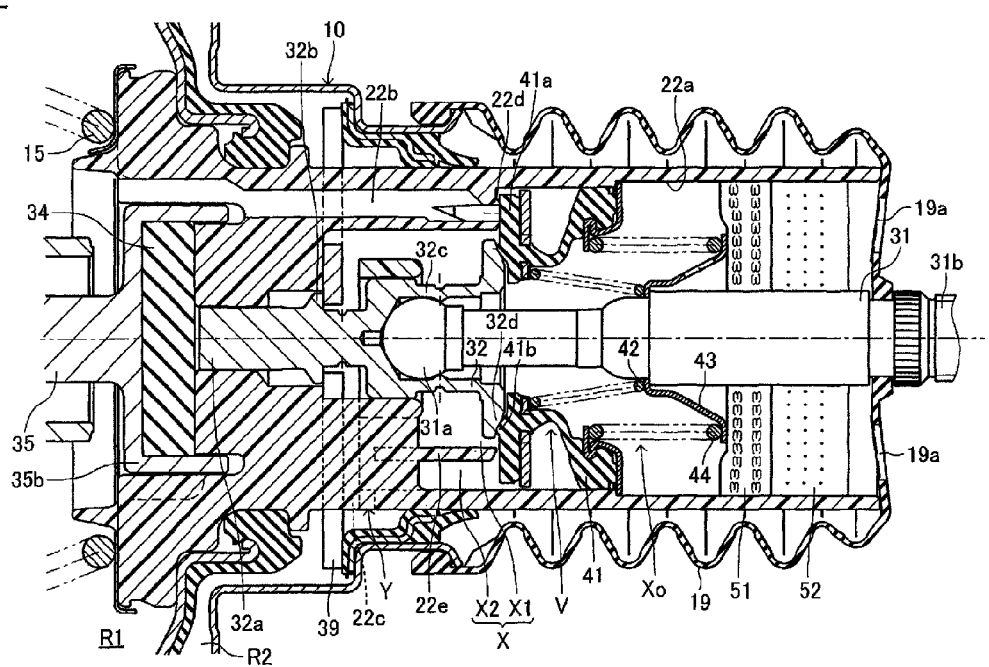
FIG. 2 is an enlarged cross-sectional view of a substantial part of the vacuum brake booster illustrated in FIG. 1.

Further, as shown in FIG. 1 and FIG. 2, according to the return of the input shaft 31 and the plunger 32 to their initial position relative to the valve body 22, when the air valve seat 32d contacts with the air valve seat portion 41b and the vacuum valve portion 41a separates from the vacuum valve seats 22d, the communication between the atmospheric air and the variable pressure chamber R2 is interrupted and the variable pressure chamber R2 communicates with the vacuum chamber R1. In this situation, the air in the variable pressure chamber R2 is suctioned by the vacuum pressure in the vacuum chamber R1 and flows into the vacuum chamber R1 through the radial passage Y and the axial passage X formed in the valve body 22, the gap between vacuum valve seats 22d and the vacuum valve portion 41a, the vacuum passages 22b and so on.

Figure 3:
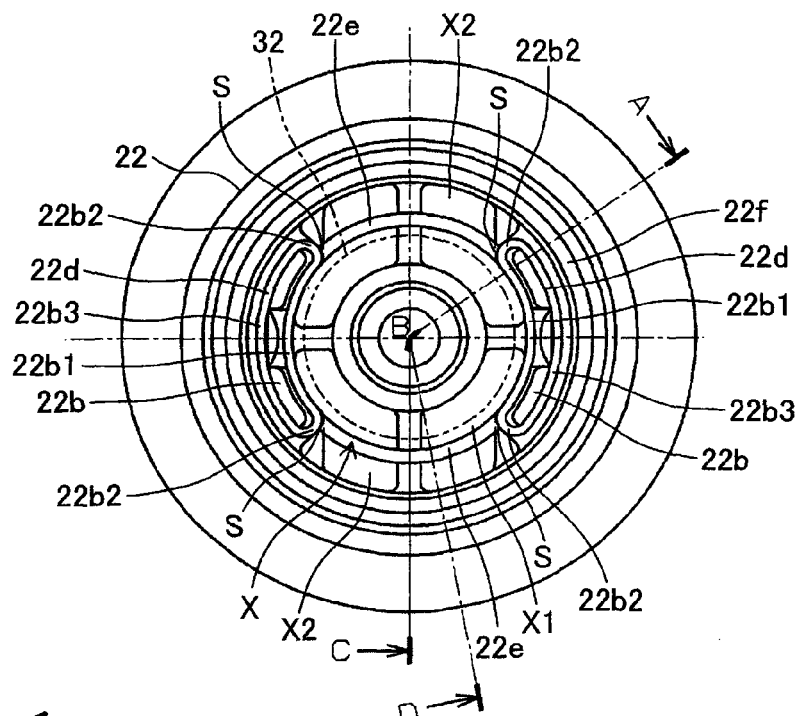
FIG. 3 is a rear view of a valve body illustrated in FIG. 1 and FIG. 2.
Figure 4:
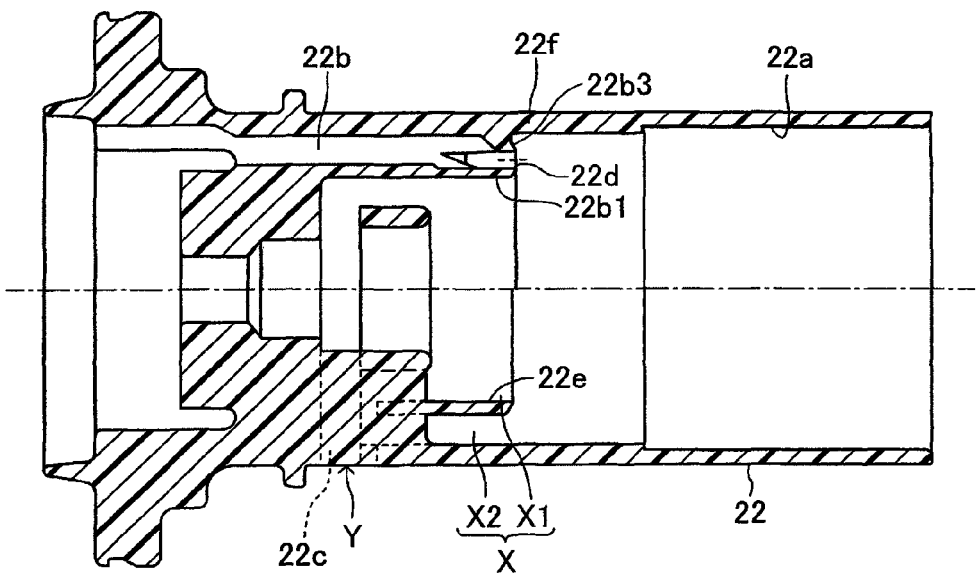
FIG. 4 is a cross-sectional view of the valve body illustrated in FIG. 3 along the section line A-B-C.
Figure 5:
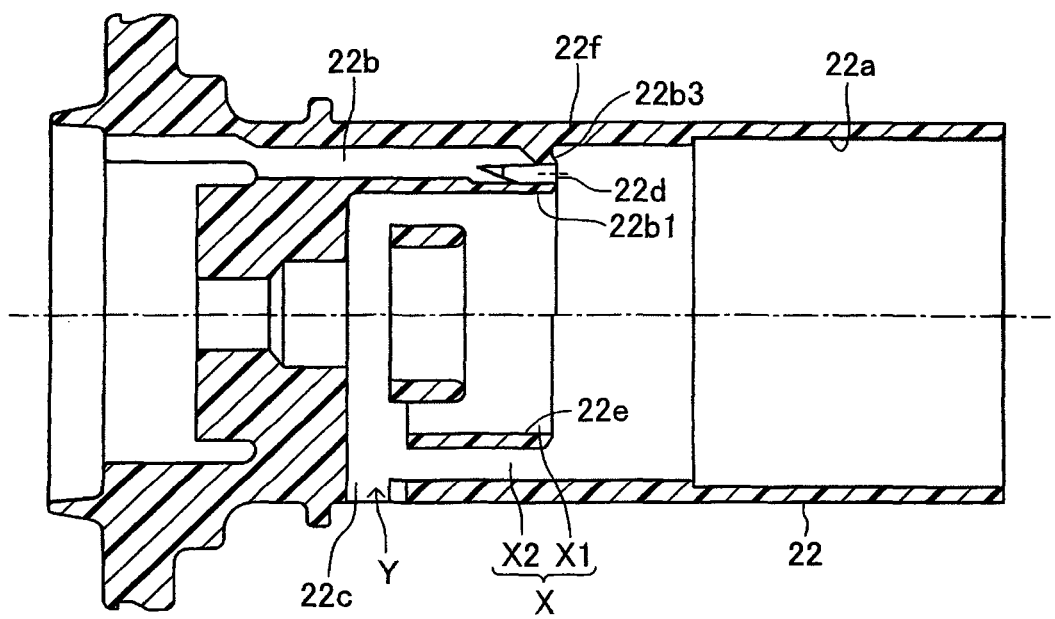
FIG. 5 is a cross-sectional view of the valve body illustrated in FIG. 3 along the section line A-B-D.

As shown in FIG. 2 and FIG. 3, an axial passage Xo (refer to FIG. 2) which communicates to the atmospheric air at its rear end portion is formed in the valve body 22 and the above axial passage X is a part of the axial passage Xo which is located forward of the air valve. The axial passage X is formed by a cylindrical inner passage X1 and a pair of outer passages X2 which are formed at the outer circumference of the inner passage X1. The cylindrical inner passage X1 is formed at the outer circumference of the plunger 32 by a pair of arc-like flow regulating walls 22e formed on the valve body 22 and arc-like inner circumferential wall portions 22b1 of passage forming walls which form or define each vacuum passage 22b. The pair of outer passages X2 has an arc-like configuration, respectively and are formed respectively by the pair of arc-like regulating walls 22e and circumferential arc end walls 22b2 of the passage forming walls which form or define each vacuum passage 22b. The outer passages X2 are communicated with each other at their rear ends through passages formed between arc-like outer circumferential wall portions 22b3 of the passage forming walls and a cylindrical outer wall 22f of the valve body 22f.

On the other hand, as shown in FIG. 1 to FIG. 5, the radial passage Y is formed in a part of the valve body 22 in which the vacuum passages 22b are not formed. A radial outer end of the radial passage Y is communicated with the variable pressure chamber R2 and a radial inner portion of the radial passage Y is communicated with the axial passage X. The radial passage Y is formed corresponding to the outer passages X2 of the axial passage X and communicates with a front end portion of the inner passage X1 and front end portions of the outer passage X2 at its radial inner portion.

In this embodiment, as shown in FIG. 3, stepped portions S are formed between each vacuum valve seats 22d and each arc-like regulating wall 22e (the connecting portion between the seat surfaces of the vacuum valve seats 22d and the arc-like regulating walls 22e). The stepped portions S are formed for ensuring the seating of the vacuum valve portion 41a on the vacuum valve seats 22d, respectively. The height of each stepped portion S is set on the basis of the quality or characteristics of the material of the vacuum valve portion 41a (for example, hardness) and the elastic deformation amount of the vacuum valve portion 41a under the condition of the seating or contact of the vacuum valve portion 41a on the vacuum valve seats 22d is set to a desired amount.

When the brake pedal is depressed and the input shaft 31 and the plunger 32 are axially moved forward from their initial positions (returned positions) relative to the valve body 22, the vacuum valve portion 41a contacts or engages with the vacuum valve seats 22d and the vacuum valve is closed so that the communication between the vacuum chamber R1 and the variable pressure chamber R2 is interrupted. Further, the air valve seat 32d is separated from the air valve portion 41b and the air valve is opened so that the variable pressure chamber R2 is communicated to the atmospheric air. Thereby, the atmospheric air flows into the variable pressure chamber R2 through the axial passage Xo (including the axial passage X of the front part thereof) and the radial passage Y. Then, the pressure in the variable pressure chamber R2 becomes to atmosphere pressure and the output force corresponding to the pressure difference between the vacuum chamber R1 and the variable pressure chamber R2 generates in the output shaft 35. Further, when the output force generates in the output shaft 35, the reaction force is transmitted from the output shaft 35 to the front surface 34a of the reaction member 34 and is transmitted from the rear surface to the valve body 22 and the plunger 32.

In this embodiment, the arc-like regulating walls 22e are formed on the valve body 22 and the cylindrical inner passage X1 is formed at the outer circumference of the plunger 32. Further, the outer passages X2 are formed at the outer circumference of the inner passage X1 and the cylindrical inner passage X1 is formed by the arc-like regulating walls 22e and the arc-like inner circumferential wall portions 22b1 of the passage forming walls which form or define each vacuum passage 22b. Thereby, the atmospheric air after the open air valve (the gap between the air valve seat 32d and the air valve portion 41b) passed flows mainly in the cylindrical inner passage X1 and flows into the radial passage Y. Accordingly, the arc-like regulating walls 22e and the arc-like inner circumferential wall portions 22b1 prevent the throttled or drawn atmospheric air when passing the air valve from becoming a spreaded flow into a large space between the valve body 22 and the plunger 32 (the spreaded flow into the large space can become a turbulent flow by rapid volume change). Thereby, the generation of the turbulent flow in the part between the valve body 22 and the plunger 32 is prevented and the generation of the response lag of the operation of the vacuum brake booster and the operation noise is prevented.

Further, in this embodiment, when the input shaft 31 and the plunger 32 are axially moved rearward from the forward movement position to the initial position relative to the valve body 22, the air valve is closed and the communication between the variable pressure chamber R2 and the atmospheric air is interrupted. Then, the vacuum valve is opened and the vacuum chamber R1 is communicated to the variable pressure chamber R2. Thereby, air flows from the variable pressure chamber R2 into the vacuum chamber R1 through the radial passage Y, the axial passage X and the vacuum passages 22b and the pressure in the variable pressure chamber R2 becomes from the pressure being approximate to the atmosphere pressure to negative pressure sequentially. Thereby, the pressure difference between the vacuum chamber R1 and the variable pressure chamber R2 disappears and the output force disappears. In this case, air which flows from the variable pressure chamber R2 to the vacuum chamber R1 in the axial passage X flows in both of the inner passage X1 and the outer passages X2. Thereby, the responsive property which the pressure in the variable pressure chamber R2 decrease from the pressure being approximate to the atmosphere pressure until the pressure being approximate to negative pressure is maintained successfully (good responsive property is maintained).

Further, in this embodiment, the stepped portions S for ensuring the seating of the vacuum valve portion 41a on the vacuum valve seats 22d, respectively are formed between each vacuum valve seats 22d and each arc-like regulating wall 22e (the connecting portion between the seat surfaces of the vacuum valve seats 22d and the arc-like regulating walls 22e). Thereby, when the vacuum valve portion 41a is contacted with the vacuum valve seats 22d, the surface pressure of the vacuum valve portion 41a to the vacuum valve seats 22d can be ensured and a good sealing condition can be ensured.

The height of each stepped portion S is set on the basis of the quality or characteristics of the material of the vacuum valve portion 41a (for example, hardness) and the elastic deformation amount of the vacuum valve portion 41a under the condition of the seating or contact of the vacuum valve portion 41a on the vacuum valve seats 22d is set to a desired amount. Therefore, when the vacuum valve portion 41a is contacted with the vacuum valve seats 22d, the annular portion of the vacuum valve portion 41a contacts with the end surfaces of the arc-like regulating walls 22e (the right end surface in FIG. 4 and FIG. 5) and is received by these end surfaces. Accordingly, it is able to obtain a desired characteristics (jumping characteristic and hysteresis characteristic) under the condition that the durability of the vacuum valve portion 41a is ensured.

In the above mentioned embodiment, the cylindrical inner passage X1 which is formed at the outer circumference of the plunger 32 is formed or constituted by the pair of arc-like regulating walls 22e and the pair of arc-like inner circumferential wall portions 22b1. However, the configuration and number of pieces of a regulating wall (22e) and a inner circumferential wall (22b1) which form or constitute a cylindrical inner passage (X1) can be changed arbitrarily and the present invention is not limited to the above mentioned embodiment.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vacuum brake booster comprising:
   a housing;
   a movable wall dividing an inner space of the housing into a vacuum chamber and a variable pressure chamber;
   a valve body connected to the movable wall and having an axial hole;
   a plunger disposed in the axial hole of the valve body and being movable in the axial direction relative to the valve body;
   a valve mechanism disposed in the axial hole of the valve body and having a vacuum valve for establishing or interrupting the communication between the vacuum chamber and the variable pressure chamber corresponding to the movement of the plunger and having an air valve for establishing or interrupting the communication between the variable pressure chamber and atmosphere;
   a reaction member disposed in the axial hole of the valve body and being able to engage with a front end portion of the plunger and a front end portion of the valve body at its rear surface;
   an output member disposed in the axial hole of the valve body, being engaged with a front surface of the reaction member at its rear end portion and being movable in the axial direction relative to the valve body;
   a vacuum passage formed in the valve body and being communicated to the vacuum chamber at its front end;
   an axial passage formed in the valve body and being communicated to atmosphere at its rear end portion;
   a radial passage formed in the valve body, being communicated to the variable pressure chamber at its radial outer end and being communicated to the axial passage at its radial inner part, wherein atmosphere flows into the variable pressure chamber through the axial passage and the radial passage when the communication between the vacuum chamber and the variable pressure chamber is interrupted by the vacuum valve and the communication between the variable pressure chamber and atmosphere is established by the air valve, and wherein air flows from the variable pressure chamber to the vacuum chamber through the radial passage, a part of the axial passage being located forward of the air valve and the vacuum passage when the communication between the variable pressure chamber and atmosphere is interrupted by the air valve and the communication between the vacuum chamber and the variable pressure chamber is established by the vacuum valve;

a flow regulating wall formed in the valve body;

a cylindrical inner passage formed at the outer circumference of the plunger by the flow regulating wall and an inner circumferential wall portion of a passage forming wall which forms the vacuum passage; and an outer passage formed at the outer circumference of the inner passage by the flow regulating wall and circumferential end walls of the passage forming wall, wherein the part of the axial passage being located forward of the air valve is formed by the inner passage and the outer passage.

2. A vacuum brake booster according to claim 1, wherein an arc-like valve seat portion is formed at the rear end portion of the vacuum passage and a stepped portion for ensuring the seating of the vacuum valve on the valve seat portion is formed between the valve seat portion and the flow regulating wall.

3. A vacuum brake booster according to claim 2, wherein a height of the stepped portion set on the basis of the characteristics of the material of the vacuum valve and the elastic deformation amount of the vacuum valve under the condition of the seating of the vacuum valve on the valve seat portion is set to a desired amount.

* * * * *